United States Patent [19]

Hirata

[11] Patent Number: 5,223,988
[45] Date of Patent: Jun. 29, 1993

[54] RECORDING/REPRODUCING APPARATUS WITH NOISE REMOVAL AND MASKING OF PHASE ROTATIONAL POSITION SIGNAL

[75] Inventor: Masafumi Hirata, Tokyo, Japan

[73] Assignee: Fuji Photo Film Co., Ltd., Kanagawa, Japan

[21] Appl. No.: 850,166

[22] Filed: Mar. 13, 1992

Related U.S. Application Data

[63] Continuation of Ser. No. 380,033, Jul. 14, 1989, abandoned.

[30] Foreign Application Priority Data

Jul. 14, 1988 [JP] Japan ............................... 63-173673

[51] Int. Cl.⁵ ............................................. G11B 5/02
[52] U.S. Cl. ............................................... 360/27
[58] Field of Search ................... 360/35.1, 51, 73.03, 360/27; 369/59, 48; 358/903

[56] References Cited

U.S. PATENT DOCUMENTS

| | | | |
|---|---|---|---|
| 4,322,757 | 3/1982 | Hatakeyama | 360/70 |
| 4,692,815 | 9/1987 | Kawahara et al. | 360/35.1 |
| 4,710,827 | 12/1987 | Okita | 360/35.1 |

Primary Examiner—Aristotelis Psitos
Assistant Examiner—Won Tae C. Kim
Attorney, Agent, or Firm—Birch, Stewart, Kolasch & Birch

[57] ABSTRACT

A recording/reproduction device uses a PG signal, generated in a yoke in accordance with rotation of a magnetic disc using a PG yoke, as a timing signal for recording or reproduction of video signals. A noise other than the PG signal is removed therefrom by rejecting a signal unless a signal status of "H" or "L" continues for a predetermined period of time or more. Also, a signal generated with a period shorter than that of the PG signal generated by one full turn of the magnetic disc is masked.

14 Claims, 7 Drawing Sheets

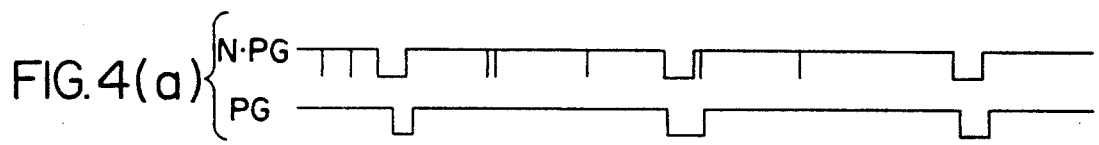
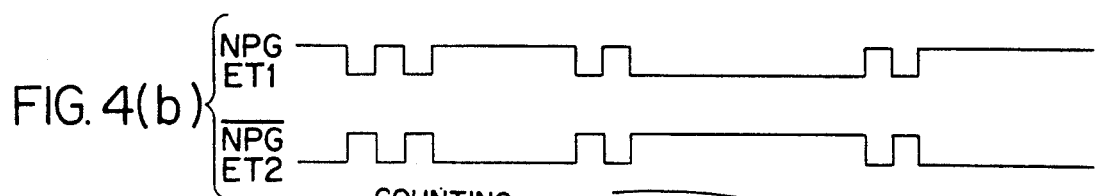
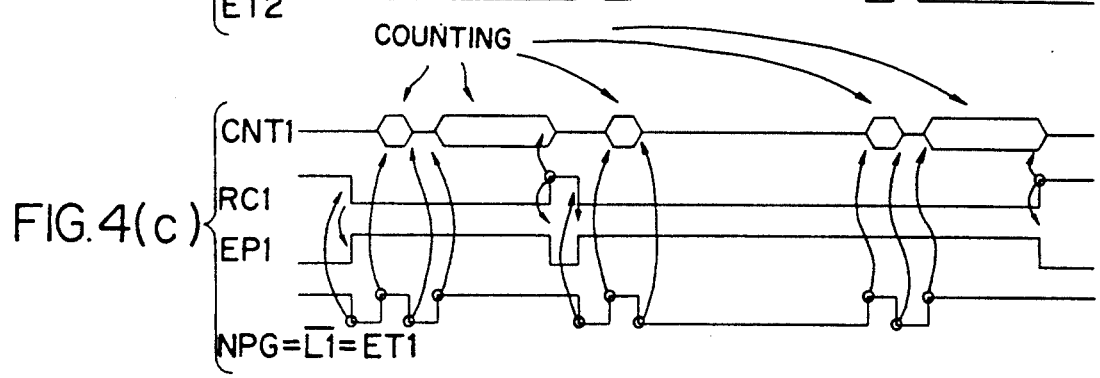
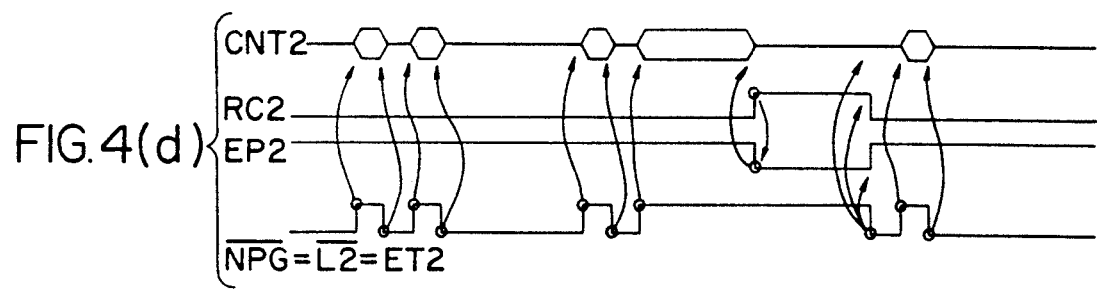
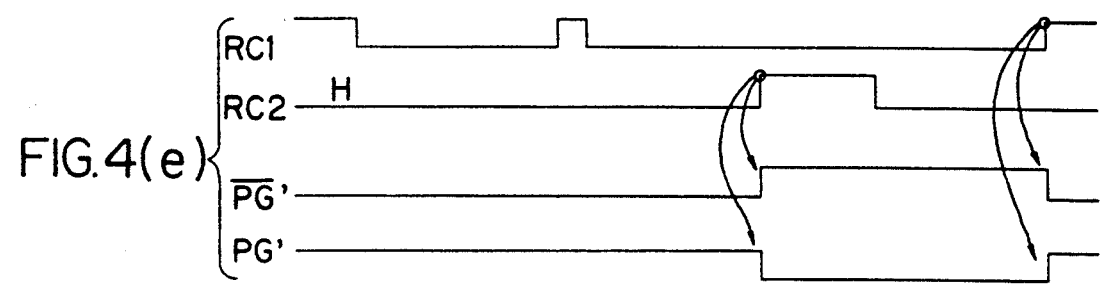

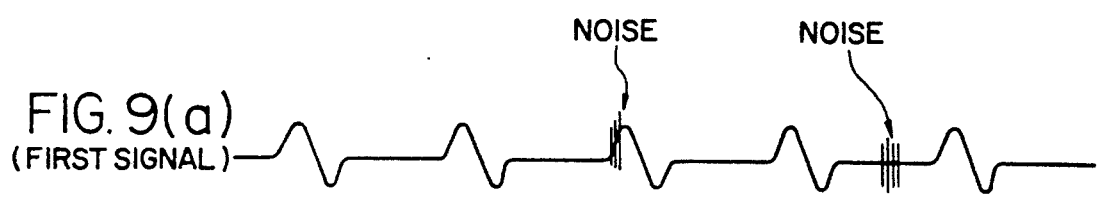
FIG. 9(a) (FIRST SIGNAL) — NOISE, NOISE
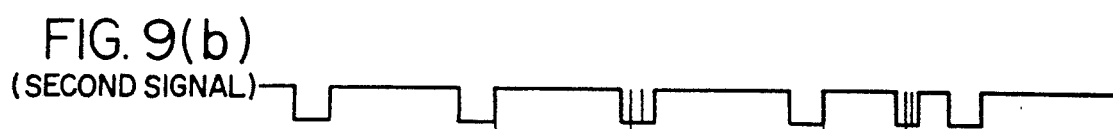
FIG. 9(b) (SECOND SIGNAL)
FIG. 9(c) RECEN
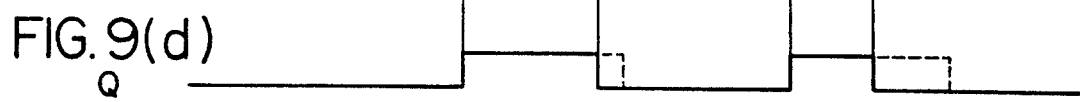
FIG. 9(d) Q

RECORDING/REPRODUCING APPARATUS WITH NOISE REMOVAL AND MASKING OF PHASE ROTATIONAL POSITION SIGNAL

This application is a continuation of application Ser. No. 07/380,033 filed on Jul. 14, 1989, now abandoned.

BACKGROUND OF THE INVENTION

1. Field of the Invention

This invention relates to a recording/reproducing apparatus which includes a PG yoke for detecting timing signals for recording or reproducing apparatus which includes a PG yoke for detecting timing signals for recording or reproducing signals from a magnetic recording medium which removes noise from the PG signal to ensure correct recording timing.

2. Description of the Background Art

In a still video system which records still video signals on a magnetic disc and reproduces video signals from the magnetic disc, a rotational position detection signal of a rotating magnetic disc is used in a servo system for a magnetic disc drive motor and in the head selection for frame recording. The rotational position detection signal, or so-called a PG signal, is obtained when a PG yoke provided on the magnetic disc passes over predetermined position as the magnetic disc rotates.

FIG. 8 is a circuit diagram showing ON/OFF control of the recording signal in the recording operation, as an example of the use of the PG signal. In FIG. 8, numeral 1 indicates a PG sensor, numeral 2 indicates an amplifier, numeral 3 indicates a hysteresis circuit, numeral 4 indicates a monomultivibrator for adjusting the PG switching position, numeral 5 indicates a D flip-flop for obtaining a Q output of a recording enable signal using the output of the monomultivibrator 4 as a clock, and numeral 6 indicates a recording switch controlled by the output of the D flip-flop 5. A recording system comprises CCD imaging device 7 a signal processing circuit 8 for the video signal obtained, a Y-FM modulator 9 and a chroma FM modulator 10, a recording amplifier 11, and a magnetic head 12. The recording switch 6 is disposed between the recording amplifier 11 and the head 12, which uses the PG signal to perform ON/OFF control of recording.

However, a signal from the PG sensor 1 (called a first signal) and an output signal (called a second signal) of the monomultivibrator 4, which is obtained by waveform-shaping the first signal, may sometimes contain magnetic or electrostatic noise or noise from other causes, as shown in FIG. 9. Since this noise input to the D flip-flop the second signal at the clock terminal and the recording enable signal (called a RECEN signal) input at a D terminal combine to form the O output, for example, the switch 6 is switched at a period shorter than the normal period indicated by the broken lines in FIG. 9. According, the video signal is not recorded at a correct timing, resulting in an unrecorded part of the video signal. In addition, in frame reproduction, for example, there is a possibility of switching the inner-side and outer-side heads at a part other than the proximity of the vertical sync signal, resulting in a disturbed or skewed image on the television screen.

SUMMARY OF THE INVENTION

In accordance with the present invention, there is provided a recording/reproduction device which uses a PG signal, generated in accordance with rotation of a revolving body such as a magnetic disc, in a recording system and a reproduction system, wherein the PG signal is passed through a noise reduction circuit which rejects a signal unless a signal status of H or L, that is high or low respectively, continues for a predetermined period of time or more, and a mask circuit for masking signals generated with a period shorter than that of the PG signal generated in accordance with rotation of the magnetic disc, thereby obtaining the normal PG signal and reducing noises other than the normal PG signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 4(a)-(b) are schematic showing waveforms in the noise reduction circuit shown in FIG. 3;

FIGS. 9(a)-(d) are schematics showing waveforms of the prior art device shown in FIG. 8.

DETAILED DESCRIPTION OF PREFERRED EMBODIMENT

Figure 1:
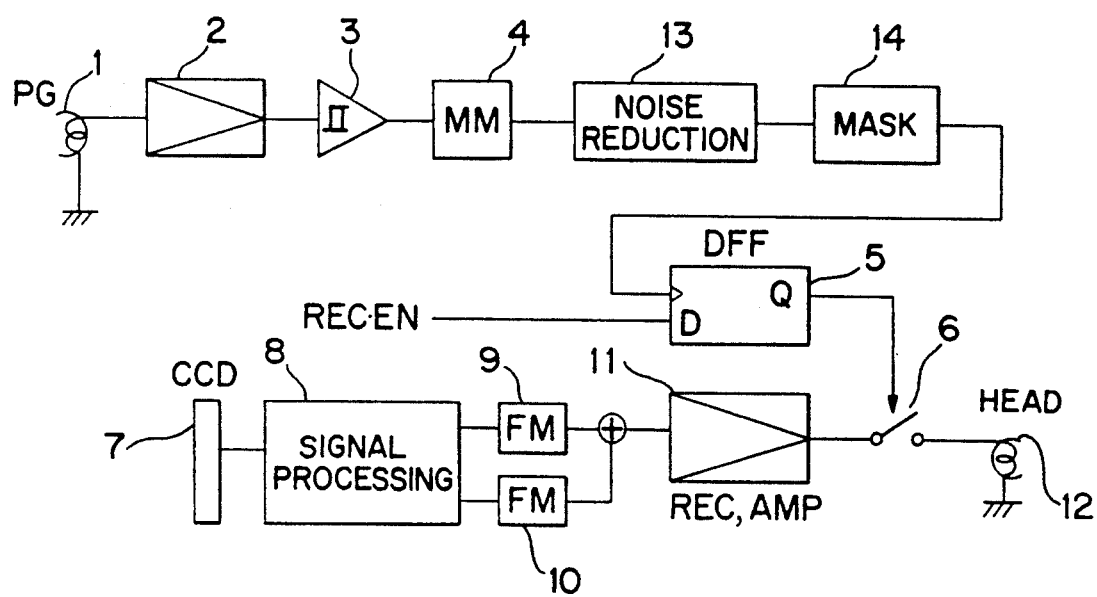
FIG. 1 is a block diagram of a recording system of an embodiment of the present invention.
Figure 2:
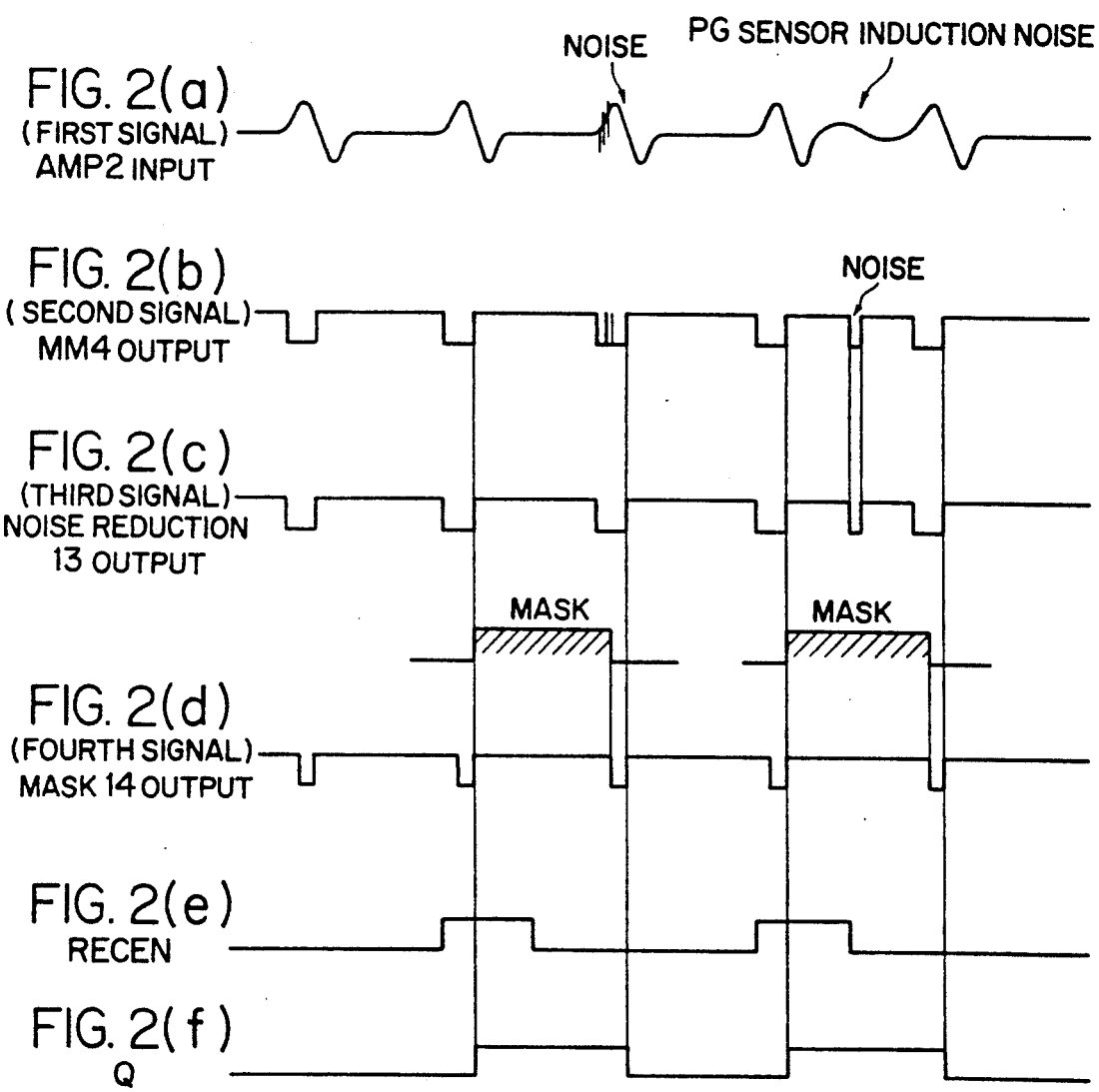
FIGS. 2(a)-(f) are schematics showing waveforms of the recording system shown in FIG. 1.

A preferred embodiment of the present invention will now be described with reference to FIGS. 1 to 7. FIG. 1 is a circuit block diagram of an embodiment of the recording system of the present invention. The same parts and components a used in FIG. 8 are indicated by the same reference numbers and not described in detail. Referring to FIG. 1, a noise reduction circuit 13 and a mask circuit 14 are disposed in series between a monomultivibrator 4 and D flip-flop 5. The noise reduction circuit 13 ignores a logic level if the "H" or "L" level does not continue for a time longer than a predetermined period, and the mask circuit 14 masks a signal, if any, similar to a first signal when it appears with a shorter time interval than the period of the normal first signal. Thus, as shown in FIG. 2, when a sporadic "H" or "L" noise or a continuous noise generated in the first signal (same for second signal), the "H" or "L" noise is removed by the noise reduction circuit 13 and the continuous noise is removed by the mask circuit 14, thus obtaining a fourth signal as an output of the mask circuit 14. As a result, a normal ON/OFF switching signal Q is obtained.

Figure 3:
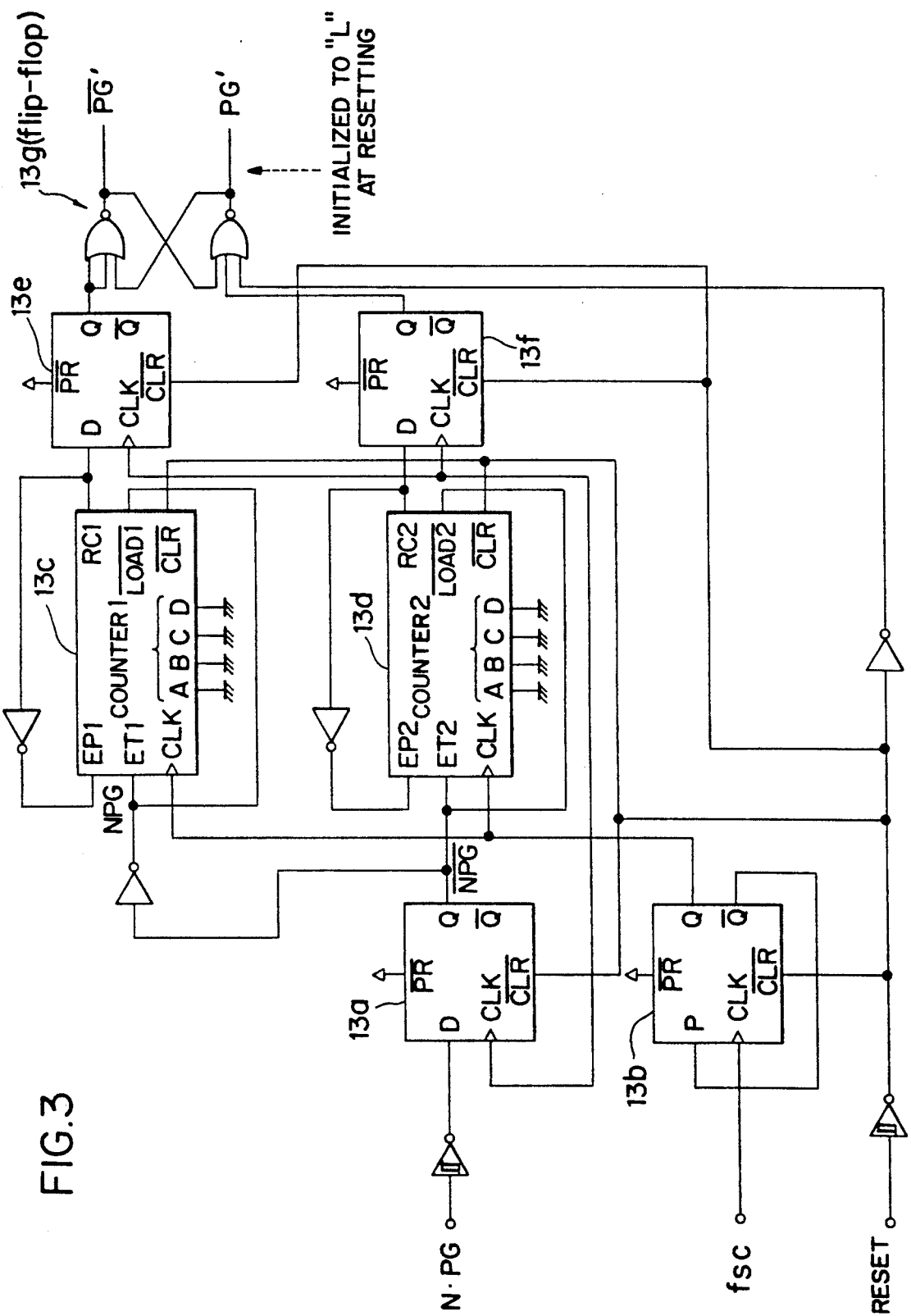
FIG. 3 is a block diagram showing an example of a noise reduction circuit.

FIG. 3 is a circuit diagram showing an example of the noise reduction circuit 13. Referring to FIG. 3, numeral 13a indicates a D flip-flop which synchronizes the input signal with a CLK, numeral 13b indicates a ½ frequency divider for a frequency fsc, numerals 13c and 13d indicate counters, and numerals 13e, 13f, and 13g indicate flip-flops. A second signal (N·PG) is waveform-shaped by a Schmitt trigger, and a signal $\overline{NPG}$ is thereafter output from D flip-flop 13a. A clock signal is obtained as an fsc/2 output of the frequency divider 13b. The counter 13c counts by the clock while NPG ($\overline{NPG}$ waveform shown in FIG. 4) is at an H level (FIG. 4, waveform $\overline{L_1}$, CNT1) and, when the count value reaches F and the decoding condition is satisfied, causes the overflow output (FIG. 4, RC1 waveform) to go H. Then, the counter 13c inverses the signal RC1 to stop the counter 13c (FIG. 4, EP1 waveform) and maintains the output RC1 at the H level. At this moment, since the input $\overline{NPG}$ of the counter 13d is at L (FIG. 4, $\overline{NPG}$ waveform), the counter 13d is standstill and an output RC2 of the counter 13d goes L (FIG. 4, RC2 waveform), a terminal EP2 goes H, the output RC2 goes from L to H, and an output PG' goes from H to L.

When the individual counters 13c and 13d are standstill, these counters are always in the preset state.

Therefore, if for example a counter stops before the decode condition is satisfied, it is preset, and a next operation of the counter always begins with the present value. When the input signal continues for a predetermined period of time, the PG' output goes H, and when L continues for a predetermined period of time, the PG' output goes L, any change during the period is not accepted, and the previous state of the output (FIG. 4, RC1, RC2, $\overline{PG'}$, PG'). Thus, noise signals having small pulse widths are removed.

Figure 5:
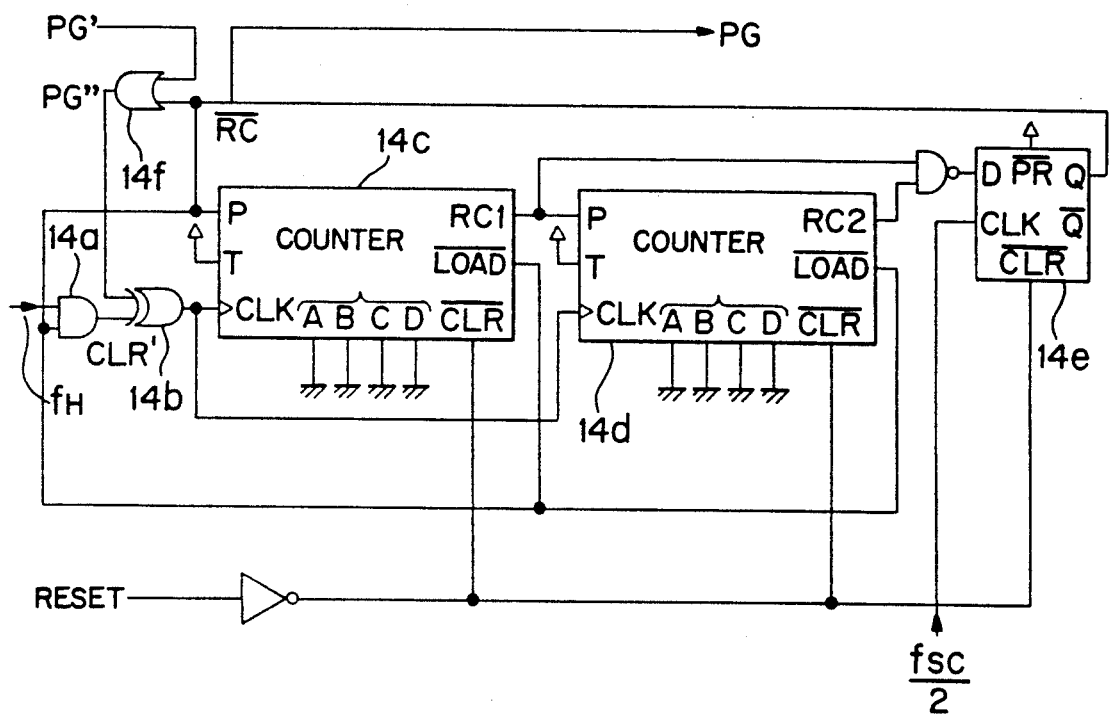
FIG. 5 is a block diagram of a mask circuit.
Figure 6:
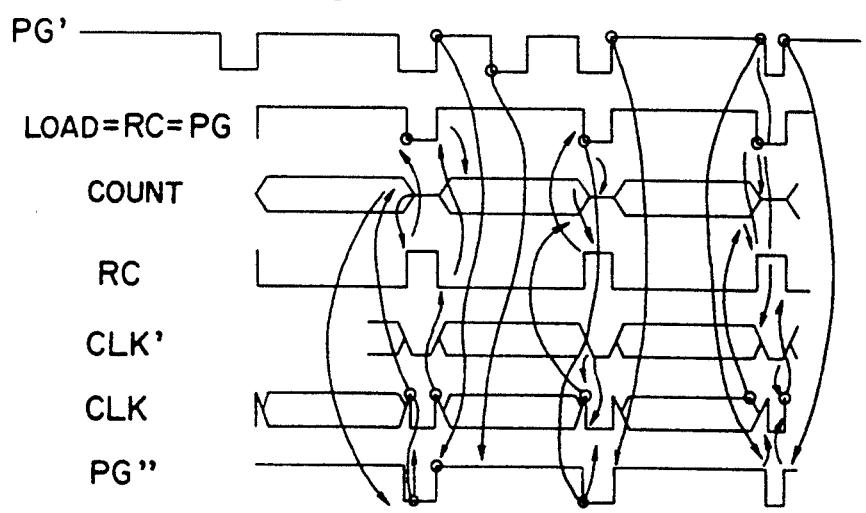
FIG. 6 is a schematic showing waveforms of the mask circuit shown in FIG. 5.

Now, an example of the mask circuit 14 will be described with reference to FIG. 5. Referring to FIG. 5, numeral 14a indicates an AND circuit having a horizontal scanning frequency fH at a first input, numeral 14b is an EX-OR circuit, numerals 14c and 14d indicate counters, numeral 14e indicates a D flop-flip using fsc/2 shown in FIG. 3 as a clock, and numeral 14f is an OR circuit. The OR circuit 14f receives the output PG' from the noise reduction circuit, and the reversed frequency fH becomes a clock CLK for the counters 14c and 14d. Under such conditions, when the counters 14c and 14d are not in the decode condition, outputs of the counters are RC1=RC2=L, the Q output of the D flip-flop 14e is $\overline{RC}$=H=PG, enabling the counter operation. When the decode condition of the counters 14c and 14d is satisfied by the count, the Q output of the D flip-flop 14e is $\overline{RC}$=L, the output of the AND circuit 14a goes L to cause clock CLK'=CLK=L, and the counters 14c and 14d are stopped into the preset state. In this case, a change in the noise reduction circuit output PG' from L to H causes PG''=H=CLK, and the counters 14c and 14d are loaded. As a result, the decode condition becomes unsatisfied, which causes $\overline{RC}$=H, and counting is restarted. Thus, during the counter operation, a continuous noise is generated in the output PG' an the decode condition is unsatisfied even with any changes, and $\overline{RC}$ remains unchanged but, at the moment the counters stop, which causes $\overline{RC}$=L, and when PG' goes from L to H while the counters are at standstill, the counters begin counting again, with $\overline{RC}$. The procedure is repeated. Therefore, for a predetermined period of time while the counters are in operation, changes in the PG' signal from L to H, that is, generation of a noise, are not accepted, but only a change from L to H after the lapse of the period is accepted. Thus, the signal for the period is masked to obtain the output PG. FIG. 6 shows waveforms in the circuit shown in FIG. 5.

By virtue of the double noise reduction functions of the noise reduction circuit and the mask circuit shown in FIG. 3 and FIG. 5, a normal PG signal is obtained as an output of the D flip-flop 5 shown in FIG. 1.

Figure 7:
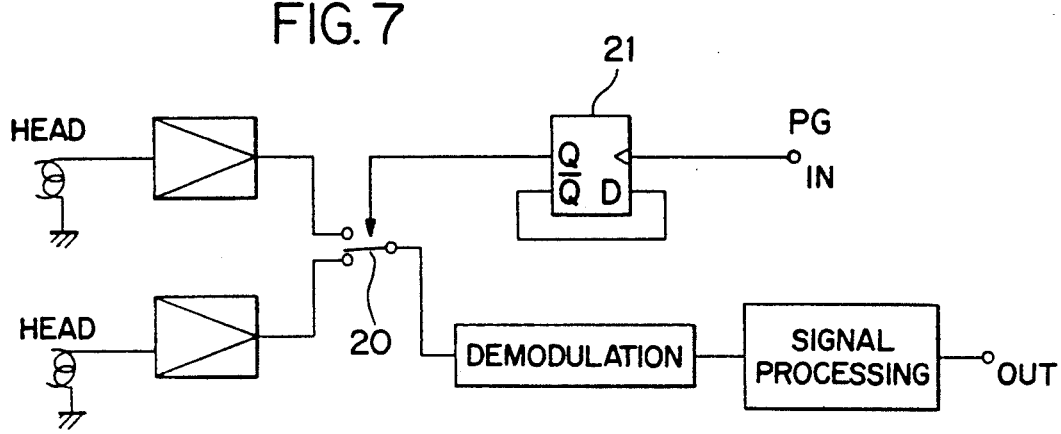
FIG. 7 is a block diagram of a reproduction system.
Figure 8:
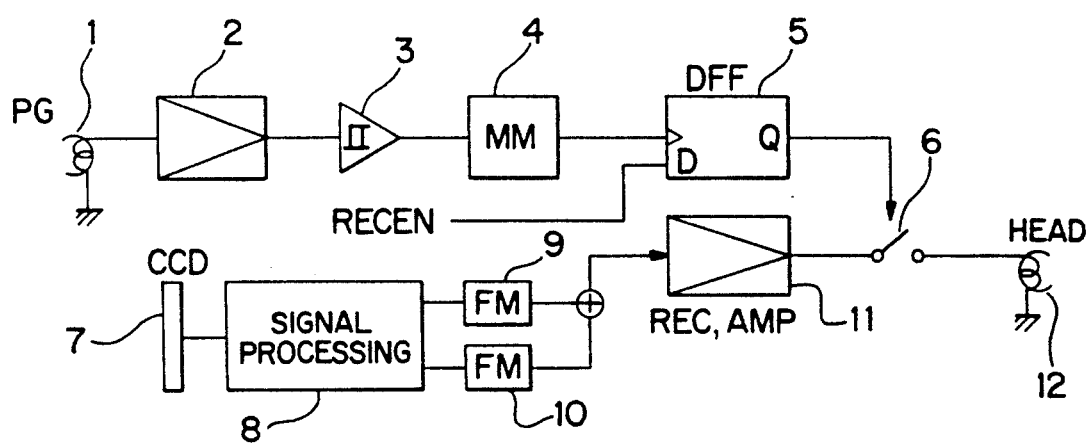
FIG. 8 is a block diagram of a prior art device.

FIG. 7 is a digram showing an example of a reproduction system other than the recording system shown in FIG. 1, which uses the normal PG signal obtained through the noise reduction circuit 13 and the mask circuit 14 as a PG input for a D flip-flop 21 to drive a select switch 20.

In the circuit shown in FIG. 1, the mask circuit 14 is disposed after the noise reduction circuit 13 but, alternatively, the noise reduction circuit may be disposed after the mask circuit. However, disposing the mask circuit after the noise reduction circuit 14 affords a better noise reduction effect.

By virtue of the noise reduction, a normal PG signal can be obtained, thereby preventing mis-recording of video signals, disturbance of images on the screen, and skew generation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A recording and reproducing apparatus for recording and reproducing a video signal of one frame on one or two tracks of a recording medium in synchronism with a rotary phase detection signal, the apparatus including a rotary body for rotating the recording medium in synchronism with a rotary phase detection signal, the rotary phase detection signal being generated by rotary phase signal detection means and comprising plural pulses of specified pulse width repeating with a specified pulse period, a pulse being generated each rotation of the rotary body, the apparatus comprising:

noise removing means for removing from the rotary phase detection signal noise which is of pulse width narrower than the specified pulse width of the plural pulses; and masking means, coupled in series with said noise removing means, for rejecting a false rotary phase detection signal which repeats with a pulse period shorter than the specified pulse period of the plural pulses of the rotary phase detection signal.

2. The recording and reproducing apparatus of claim 1, further comprising switching means for alternately turning a recording signal on and off in response to the rotary phase detection signal passed through the series connection of said noise removing means and said masking means.

3. The recording and reproducing apparatus of claim 1, further comprising selection means for selecting one of two heads used during recording and reproducing in response to the rotary phase detection signal passed through the series connection of said noise removing means and said masking means.

4. The recording and reproducing means of claim 1, wherein said noise removing means is coupled to receive the rotary phase detection signal output from the rotary phase signal detection means and said masking means is coupled to receive the rotary phase detection signal after noise is removed therefrom in said noise removing means.

5. The recording and reproducing means of claim 1, wherein the rotary body is disk shaped, the recording medium is a magnetic disk, and the rotary phase signal detection means comprises sensor means, operatively coupled to a motor which rotates the rotary body, for generating the rotary phase detection signal.

6. A method of removing noise from a rotary phase detection signal, the rotary phase detection signal being generated by rotary phase signal detection means and comprising plural pulses of specified pulse width repeating with a specified pulse period, a pulse being generated for each rotation of a rotary body which rotates a recording medium in a recording and reproducing apparatus which records and reproduces a video signal of one frame on one or two tracks of the recording medium in synchronism with the rotary phase detection signal, comprising the steps of:
   removing noise having a pulse width which is narrower than the specified pulse width of the plural pulses of the rotary phase detection signal; and
   masking the rotary phase detection signal after removal of noise to reject pulses corresponding to a false rotary phase detection signal which repeats with a pulse period shorter than the specified pulse period of the plural pulses of the rotary phase detection signal.

7. A recording and reproducing apparatus for recording and reproducing a video signal of one frame on tracks of a recording medium in synchronism with a rotary phase signal comprising:
   detection means for generating the rotary phase signal, the rotary phase signal being generated each rotation of the recording medium;
   monomultivibrator means, coupled to said detection means, for shaping the generated rotary phase signal, the shaped rotary phase signal being comprised of plural pulses of specified pulse width repeating with specified pulse period;
   noise removal means, coupled to said monomultivibrator means, for removing from the shaped rotary phase signal noise which is of pulse width narrower than the specified pulse width and for rejecting false rotary phase signals which repeat with a pulse period shorter than the specified pulse period, to output a noise free rotary phase signal; and
   switching means, coupled to said noise removal means, for enabling recording means in response to said noise free rotary phase signal.

8. The recording and reproducing apparatus of claim 7, wherein said noise removal means comprises:
   removing means, coupled to said monomultivibrator means, for removing the noise from the shaped rotary phase signal to output a first signal; and
   masking means, coupled to said removing means, for rejecting the false rotary phase signals from the first signal to output the noise free rotary phase signal.

9. A recording and reproduction apparatus for recording and reproducing a video signal of one frame over one or two tracks of a recording medium moving relative to a recording/reproducing head in synchronization with a rotary phase detection signal which is generated in rotary phase detection means and which comprises plural pulses of specified pulse width repeating with a specified pulse period, one pulse being generated per turn of a rotary body which rotates the recording medium, comprising:
   noise removing means for removing from the rotary phase detection signal noise of pulse width narrower than the specified pulse width and for outputting only normally generated pulses of the rotary phase detection signal; and
   masking means for producing a masking condition of predetermined masking duration for rejecting false rotary phase detection signals which occur during the specified pulse period, the predetermined masking duration being shorter than the specified pulse period of the rotary phase detection signal, to maintain the generated rotary phase detection signal of the specified pulse width and the specified pulse period,
   said noise removing means and said masking means being coupled in series with the rotary phase detection means.

10. The recording and reproduction apparatus of claim 9, further comprising switching means for alternately turning a recording signal on and off in response to the rotary phase detection signal passed through the series connection of said noise removing means and said masking means.

11. The recording and reproduction apparatus of claim 9, further comprising selection means for selecting one of two heads used during recording and reproducing in response to the rotary phase detection signal passed through the series connection of said noise removing means and said masking means.

12. The recording and reproducing apparatus of claim 9, wherein said noise removing means is coupled to receive the rotary phase detection signal output from the rotary phase signal detection means and said masking means is coupled to receive the rotary phase detection signal after noise is removed therefrom in said noise removing means.

13. The recording and reproducing apparatus of claim 9, wherein the rotary body is disk shaped, the recording medium is a magnetic disk, and the rotary phase signal detection means comprises sensor means, operatively coupled to a motor which rotates the rotary body, for generating the rotary phase detection signal.

14. A method of recording and reproducing a video signal of one frame over one or two tracks of a recording medium moving relative to a recording/reproduction head in synchronization with a rotary phase detection signal which is generated in rotary phase detection means and which comprises plural pulses of specified pulse width repeating with a specified pulse period, one pulse being generated per turn of a rotary body which rotates the recording medium, comprising the steps of:
   removing noise of pulse width narrower than the specified pulse width from the rotary phase detection signal to maintain only normally generated pulses of the rotary phase detection signal; and
   generating a masking condition of predetermined masking duration for rejecting false rotary phase detection signals which occur during the specified pulse period, the predetermined masking duration being shorter than the specified pulse period of the rotary phase detection signal, to maintain the generated rotary phase detection signal of the specified pulse width and the specified pulse period.

* * * * *